March 1, 1927.  1,619,229
F. R. WOOD
OIL FEED CONSTRUCTION
Filed Jan. 4, 1923
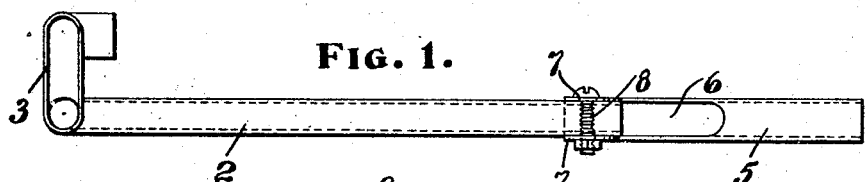
FIG. 1.
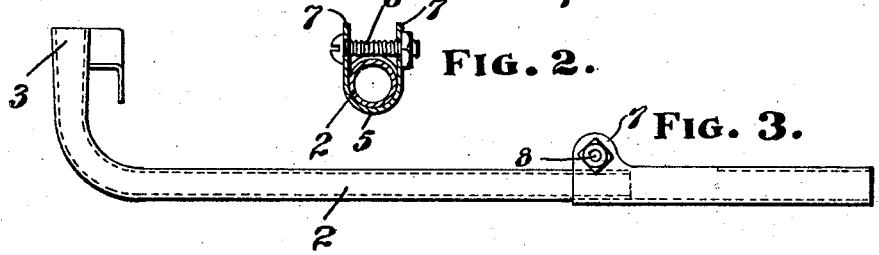
FIG. 2.
FIG. 3.
FIG. 4.
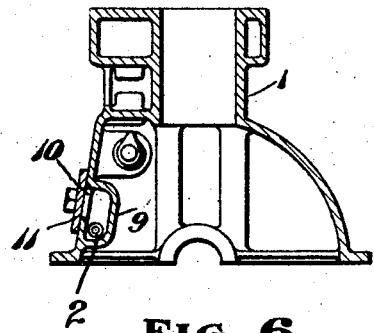
FIG. 5.
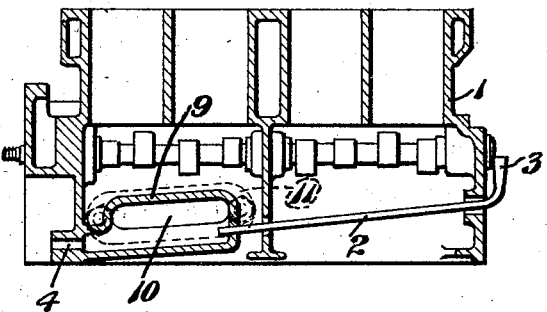
FIG. 6.
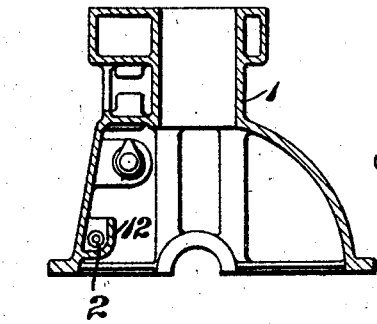
FIG. 7.
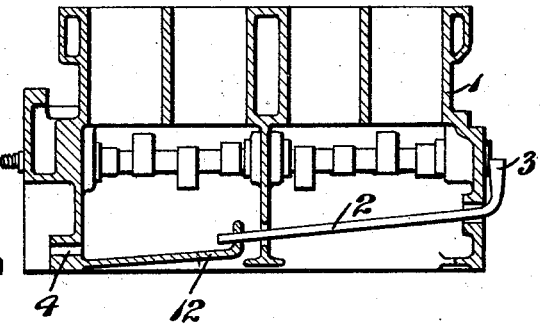
Witnesses
Arthur F. Koon
Inventor
Floyd R. Wood
By Frank E. Liverance, Jr.
Attorney Patented Mar. 1, 1927.

1,619,229

UNITED STATES PATENT OFFICE.

FLOYD R. WOOD, OF GRAND RAPIDS, MICHIGAN.

OIL-FEED CONSTRUCTION.

Application filed January 4, 1923. Serial No. 610,626.

This invention relates to a novel construction of oil feed pipe and system of oiling as applied to internal combustion engines, used with motor vehicles, particularly, the Ford motor vehicles, wherein an oil carrying pipe is located lengthwise of the engine block running from a point in front of the fly wheel of the engine to the front end thereof, the flywheel elevating oil from the bottom of the transmission casing and delivering it to the upturned and enlarged rear end of the pipe from which it flows through the pipe to the front end of the engine and is delivered at the front end of the pipe, flowing back over the bottom plate under the crank shaft to the transmission casing, a continuous movement of the oil taking place at all times the engine is running. This flow is very necessary, otherwise the crank shaft will not be lubricated at the points where the piston connecting rods are attached with the resultant burning out of the bearings. Accordingly, the pipe must be kept free for the flow of oil therethrough, and as this flow is influenced by gravity only, any clogging of the pipe soon stops the circulation of the oil. This frequently occurs, due to foreign matter getting into the oil, such as lint from the brake bands in the transmission casing, or from felt washers and the like used in the transmission construction. With a long pipe reaching to the front of the engine, the cleaning of the same of obstructions can be done only by removing the engine rediator and the cover plate or housing for the timing gears so as to get access to the front end of the oil pipe to apply an air hose thereto and force any obstruction in the pipe therefrom by compressed air, making a very expensive service feature in this connection which takes considerable time, more to get access to the pipe that the actual operation of cleaning the same which is simple and very quickly done once access is had thereto.

It is a primary object and purpose of the present invention to provide means whereby much quicker access may be had to said oil pipe for cleaning the same, a novel construction of pipe being provided for use in engines already built, and a slight modification in the structure of the engine being provided for new work, in both the access to the end of the pipe for cleaning being comporatively easy. A further object of the invention is to provide such means at low cost, and at the same time provide constructions which are durable and lasting having a life of service as long or longer than the engine to which applied. Various other objects and purposes than those stated will appear as understanding of the invention is had from the following description, taken in connection with the accompanying drawing, in which, Fig. 1 is a plan view of a novel construction of oil pipe embodying my invention and capable of substitution for the oil pipes now used.

Fig. 2 is a transverse section therethrough substantially at the coupling of the two pipe sections together.

Fig. 3 is a side elevation of the construction shown in Fig. 1.

Fig. 4 is a vertical transverse section through an engine block showing the same modified for the embodiment of my invention therein.

Fig. 5 is a longitudinal vertical section through said construction shown in Fig. 4.

Fig. 6 is a view similar to that shown in Fig. 4, a slightly different form of construction being shown, and Fig. 7 is a view like that in Fig. 5 relative to the construction shown in Fig. 6.

Like reference characters refer to like parts in the different figures of the drawing.

The engine block 1 is of the usual construction in Ford motor vehicles and in ordinary practice an oil tube 2 formed at its rear end with an upturned portion flared and widened to make a mouth portion 3 is located at one side of the block and extends downwardly and forwardly to an opening 4 in the front and at the lower portion of the same, as shown, so that oil delivered into the rear end of the tube passes from the front end on to the timing gears which are located at the front of the engine. I cut the tube off a distance back of its front end and apply thereto a section 5 to take the place of the part cut away. Said section, at its upper side and at its rear portion has a part removed leaving an elongated opening 6, as shown. The sides at each side of the opening 6 are extended upwardly at the rear end of the section 5, making ears 7 which pass above the adjacent upper side of the front end of the remaining portion of the tube 2, a bolt passing through said ears to clamp and secure the said tube sections 2 and 5 together, leaving an opening, as 6, in the upper side of the completed tube.

If this tube should be clogged so as to preclude the flow of oil, it is merely necessary to remove the lower plate at the lower side of the engine, introduce an air hose into the opening at 6, blow out both sections 2 and 5 of the tube and thus remove all obstructions in the oil tube. This form of construction is applied very readily, it being merely necessary to cut off a portion of the single oil tube now used and replace the part cut away by the section 5; and at any time the cleaning of the tube of obstructions therein is comparatively simple and easy, as the removal of the bottom plate is a short and relatively easy process, much shorter than removal of the radiator and timing gear housing to get access to the front end of the tube.

In Figs. 4 and 5, a construction is shown wherein at one side of the engine block and near the front a housing 9 is integrally cast with a side of the engine, into the rear end of which the front end of the tube section 2 passes so as to deliver the oil thereinto, the same passing outward at the front through the opening 4. An elongated opening 10 is made through the side of the engine, normally being closed by a cover plate 11, but which is readily removable whenever it is desired to get access to the front end of the tube to clean the same. This makes a very easy and convenient manner for gaining access to the tube and one inexpensive to produce initially.

In Figs. 6 and 7, the structure shown in Figs. 4 and 5 is slightly modified in that an enclosed housing is not made, as at 9, but a trough 12 open at its upper side is substituted therefor. The opening 10 and cover plate 11 therefor may be eliminated, though it is obvious that the same may be used if desired. But such structure is not necessary, as access to the end of the tube 2 may be easily had on removal of the bottom plate to the engine, and the tube cleaned by compressed air as with the other forms of structure.

My invention in the forms shown and described is practical in every way. The replacement construction shown in Figs. 1, 2 and 3, for engines in service is simple and inexpensive and with it the operation of cleaning the oil tube is greatly simplified. And for new work, the constructions shown in Figs. 4 to 7 inclusive, are likewise simple and inexpensive and thoroughly practical. The appended claim defines the invention and it is to be considered that all forms of structure coming within their scope are comprehended by the invention.

I claim:

In combination with an engine, an oil tube having its rear end turned upwardly and adapted to receive oil, said tube extending downwardly and forwardly toward the front of the engine and terminating a distance short of the front of said engine, a member having an open upper side into which the front end of the tube passes and adapted to carry oil from the tube to the front of the engine, said opening permitting application of an air hose to the front end of the tube on removal of the bottom plate of the engine whereby obstructions to oil flow in said tube may be forced therefrom.

In testimony whereof I affix my signature.

FLOYD R. WOOD.